2,807,627

CYCLIC ETHER-SULFONES

Rolf Putter, Dusseldorf, and Fritz Suckfull, Leverkusen, Germany, assignors to Farbenfabriken Bayer Aktiengesellschaft, Leverkusen, Germany, a corporation of Germany No Drawing. Application September 20, 1955, Serial No. 535,511

Claims priority, application Germany July 16, 1952

14 Claims. (Cl. 260—327)

The present invention relates to new heterocyclic compounds and to a process of producing the same. More particularly it relates to cyclic ether-sulfones and to a process of making these compounds.

The new compounds correspond to the general formula

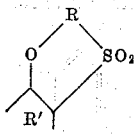

In this formula R represents an organic radical and R' an aromatic radical containing a phenolic hydroxy group. Compounds of this type are e. g.

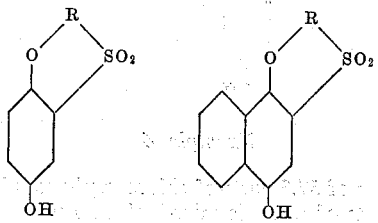

The organic radical R in these compounds may be of the aliphatic as well as of the aromatic series. Both radicals R and R' may bear substituents.

The new compounds are obtained by reacting quinones which are capable of addition in o-position to one $>C=O$ group, with organic sulfinic acids which contain in the organic part a radical capable of reacting as an anion, and by leaving the thus formed dihydroxy aryl sulfones in weakly acid almost neutral to alkaline medium, if necessary at elevated temperature, until ring-formation under condensation has taken place.

Quinones suited for the reaction are 1,4-benzoquinone and 1,4-naphthoquinone as well as their substitution products having at least one free o-position with respect to the $>C=O$ groups. Thus, among the substituted 1,4-benzoquinones which may be used are the 2,6-dichloro-; 2,6-dibromo-; 2,3-dimethyl-; 2,5-dimethyl-; 2-methyl-; 2-butyl- and 3-isopropyl-substituted compounds and among the substituted 1,4-naphthoquinones which may be used are 2-chloro-; 2-bromo-; 2-methyl-; 3-ethyl-; 2,6-dimethyl-5- or 6-alkylsulfone and 5- or 6-sulfonamide substituted compounds. Organic sulfinic acids which are suitable for the present reaction are those of the general formula $$X—R—SO_2H$$

wherein X is a radical capable of reacting as an anion, such as halogen, acyloxy, etc. Preferred for use are those sulfinic acids in which X is halogen (particularly chlorine). The term R in the above formula represents an organic radical of the aliphatic or aromatic series. Thus, the radical X includes chlorine, bromine, iodine, acetoxy, etc.; and the radical R includes lower alkylene (such as methylene, ethylene, ethylidene, isopropylene), phenylene, naphthylene, alkyl-substituted phenylene or naphthylene (such as methyl-, ethyl-, propyl-substituted phenylene or naphthylene), nitro-substituted phenylene or naphthylene, halo-substituted phenylene or naphthylene, etc. Where R is aromatic, it must, of course, contain its X substituent in a position ortho to the sulfinic acid radical. The specific sulfinic acids useful in the invention include chloro-methane sulfinic acid, bromo-methane sulfinic acid, 2-chloro-ethane sulfinic acid, 2-acetoxy-ethane sulfinic acid, o-halogeno benzene sulfinic acids (such as chlorobenzene sulfinic acid, bromobenzene sulfinic acid, dichlorobenzene sulfinic acid) and nitrobenzene sulfinic acid.

In the case of 1,4-benzoquinone, for instance, the reaction takes the following route

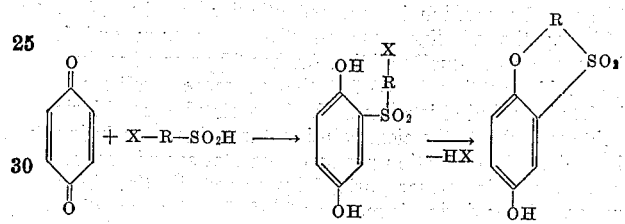

X is the radical capable of reacting as an anion, R has the same meaning as above. The preferred radical X is halogen in particular chlorine.

The first step of the reaction—the addition of the organic sulfinic acid to the quinone—is carried out in aqueous acid medium containing, if necesary, some additional acid e. g. hydrochloric acid, for, as it is known, the addition reaction only takes place if the free sulfinic acid is present. Since the sodium salt of the sulfinic acids is often used, one must in such cases, add sufficient acid, e. g. hydrochloric acid, to set free the sulfinic acid. The temperature best suited for this addition reaction varies from case to case, but can easily be found out; in general, suitable temperatures will be found between about 0° C. and about 70° C.

The second step of the reaction, the ring-formation, takes place—as stated above—in weakly acid almost neutral to alkaline medium. In general the best results are achieved at weakly alkaline reaction; in some cases, however, a more strongly alkaline reaction is preferred. But there are also cases where better yields are obtained in neutral to weakly acid medium. The most suitable reaction conditions in the individual case may be easily found out by trial. The ring-formation in general takes place very easily and smoothly, sometimes already at room temperature. In general it is expedient to use elevated temperatures up to about 100° C. in order to reduce the reaction time; in cases where the radical X is not easily exchangeable such as it is the case with chlorine in aromatic linkage, it is expedient to effect the ring-formation at higher temperature in an autoclave.

The new compounds contain, as seen from the above process description, a free hydroxy group linked to an aromatic nucleus. By way of variation in the quinone compound and in the organic sulfinic acid compound it is possible to prepare cyclic ether-sulfones containing the most varied substituents; moreover, substituents present may be changed or exchanged by known methods. Substituents may also be introduced after the ring-formation.

According to the described process and its variations the new cyclic ether-sulfones are obtained in good, partly in very good yield. The new compounds are valuable intermediates for the manufacture of dyestuffs. Thus, for example, the ether sulfones (e. g. 1,4-benzoquinone methylene sulfone ether) may be condensed with benzene diazonium chlorides (e. g. 2-hydroxybenzenediazonium chloride) in alkaline (e. g. caustic soda) solution in accordance with standard procedures to form the azo dyestuff. And, where the ether sulfone contains a primary amino group attached to the aromatic nucleus (e. g. 4-amino-5-hydroxybenzoxathiol-S-dioxide), it may be reacted with sodium nitrite in acid solution in the usual manner to form the diazonium salt, then coupled with a phenol by standard procedure to form the azo dyestuff.

The following examples illustrate the invention without limiting it thereto; the parts being by weight.

Example 1

A solution of 57.3 parts of chloro-methane sulfinic acid in 500 parts of water is mixed with 5 parts of hydrochloric acid (D=1.15) and heated to 50° C. Into this solution 50 parts of benzoquinone are sprinkled within 20 minutes. The major quantity of the quinone quickly dissolves. The reaction is completed by heating the mixture to 70° C. for 30 minutes. After removing a slight tarry residue by filtering the solution is rendered alkaline and heated to 70° C.; the alkaline reaction disappears soon and it is only after gradually adding further 30 parts of sodium hydroxide solution (D=1.35) that no more alkali metal hydroxide solution is consumed. 25 parts of hydrochloric acid are added to the clear solution, thereafter the solution is cooled. The reaction product separates soon in coarse crystals and is further purified by recrystallization from water. After drying it melts at 145° C. The analytical values (calculated: C 45.2%, H 3.3%, S 17.15%—found: C 44.95%, H 3.6%, S 17.5%) correspond to the empirical formula C₇H₆O₄S, i. e. a compound of the following structural formula:

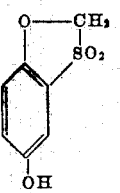

The same product is obtained when replacing in the above reaction chloro-methane sulfinic acid by bromo-methane sulfinic acid.

A mononitro compound of the M. P. 259° C. is obtained by nitrating the new compound. The nitro compound yields on reduction the corresponding amino compound of the melting point 186° C. The nitro group and the amino group respectively occupy the position between the OH-group and the —SO₂— group.

Example 2

The aqueous solution of 64.3 parts of 2-chloro-ethane sulfinic acid is reacted with 45 parts of benzoquinone in an aqueous acid medium in a manner similar to that described in Example 1. A slight quantity of a tarry residue is formed, which is removed. At 70° C. the solution is rendered weakly by adding sodium hydroxide solution. The gradual addition of further 40 parts of sodium hydroxide solution is required to maintain the weakly reaction. After 60 minutes 10 parts of hydrochloric acid are added and the solution is cooled. The well crystallized product thus obtained melts at 174° C. after recrystallizing and drying. The analytical values (calculated: C 48.0%, H 4.0%, S 16.0%—found: C 47.9%, H 4.3%, S 16.25%) correspond to the empirical formula C₈H₈O₄S, i. e. a compound of the following structural formula

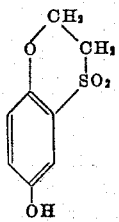

Example 3

105.5 parts of 2,5-dichloro benzene sulfinic acid and 45 parts of benzoquinone are mixed with stirring in 1000 parts of water and heated to 70° C. The benzoquinone has dissolved after 30 minutes and a thick crystal paste has formed. (A sample taken from the paste shows the M. P. 192° C. after drying.) The crystal paste is dissolved in 48 parts of sodium hydroxide solution (alkaline reaction), and heated in the autoclave to 135° C. for 5 hours. After cooling the solution is filtered and the resultant, crystalline product further purified by recrystallizing from methanol. M. P.=250° C. The analytical values (calculated C 51%, H 2.5%, S 11.3%, Cl 12.5%—found: C 51.0%, H 2.8%, S 11.6%, Cl 12.8%) correspond to the empirical formula C₁₂H₇O₄SCl, i. e. a compound of the following structural formula

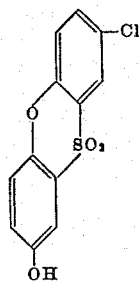

Example 4

A solution of 57.3 parts of chloro-methane sulfinic acid in 2000 parts of water is mixed with 20 parts of hydrochloric acid and cooled to 0° C. 75 parts of 1,4-naphthoquinone are gradually sprinkled into the solution. The naphthoquinone has dissolved after stirring at 0° C. for 10 hours. A thick paste of small crystals has formed. The crystal paste is adjusted to pH 9–10 with sodium carbonate solution at 0° C. the air being replaced by nitrogen and the mixture stirred for 4 hours. The mixture is then heated to 80° C., adjusted to pH 11.5 by addition of sodium hydroxide solution and the dark solution is clarified after addition of animal charcoal. On neutralizing to a weakly alkaline reaction by means of hydrochloric acid the reaction product precipitates in fine crystals. After recrystallizing from methanol the product melts at 268° C. The analytical values (calculated: C 56.0%, H 3.4%, S 13.5%—found: C 56.0%, H 3.7%, S 13.0%) correspond to the empirical formula C₁₁H₈O₄S, i. e. a compound of the following structural formula

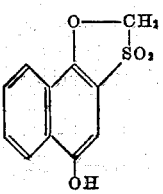

Example 5

110 parts of 2-chloro-5-nitrobenzene sulfinic acid and 45 parts of benzoquinone are stirred in 450 parts of hydrochloric acid of 1 percent at 10° C. The reaction is complete after 2 hours. The crystal paste is isolated (a sample melts at 125° C. after drying) and stirred with 500 parts of water. This mixture is rendered alkaline by addition of 70 parts of sodium carbonate and heated to 80° C. within 30 minutes. After cooling the resultant precipitate is separated, dried and recrystallized from glacial acetic acid. The product obtained melts at 298° C. The analytical values (calculated: C 49.2%, H 2.4%, N 4.8%, S 10.9%—found: C 48.9%, H 2.5%, N 4.6%, S 10.5%) correspond to the empirical formula $$C_{12}H_7O_6NS$$

i. e. a compound of the following structural formula

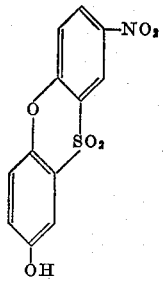

By reducing the nitro group of this compound the corresponding amino substitution product of the M. P. 249° C. is obtained.

Example 6

8.7 parts of sodium 1-acetoxy-ethane sulfinate are dissolved in 50 parts of cold water and mixed with 8 parts of hydrochloric acid of 22° Bé. The solution is combined with a finely distributed suspension of 5 parts of benzoquinone in 50 parts of water at 5° C. After about 10 minutes the benzoquinone has dissolved with separation of a slight quantity of a tarry impurity, which is removed. After addition of 16 parts of sodium hydroxide solution (D=1.35) the solution is heated and kept at the boil for 10 minutes and then rendered acid to Congo red paper with 9 parts of hydrochloric acid of 22° Bé. The reaction product crystallizes upon cooling the solution and melts at 174° C. The identity of this substance and the compound obtained according to Example 2 can be ascertained by fusing them together: M. P. 174° C.

Example 7

17.5 parts of 4.4'-dichloro-diphenyl-3-3'-disulfinic acid (obtained by reducing 4.4'-dichlorodiphenyl-3.3'-disulfochloride with aqueous Na₂SO₃ solution at 90° C.) are well stirred with 200 parts of water and 5 parts of hydrochloric acid of 22° C. After introducing 10.8 parts of benzoquinone the mixture is stirred first at room temperature for 30 minutes, then at 80° C. for 60 minutes, and finally filtered with suction when cold. The paste is dissolved in 200 parts of water with the addition of 8 parts of sodium hydroxide and the solution is heated after addition of 10 parts of sodium carbonate in an autoclave to 135° C. for 5 hours. The reaction product precipitates upon cooling in white crystals which are filtered with suction. The crystals are suspended in 100 parts of water and the suspension is rendered weakly acid by adding hydrochloric acid. The precipitate is filtered with suction and washed salt-free with water. After drying the product is obtained as a white powder which can be recrystallized from boiling pyridine (150 parts upon 1 part of substance) with the addition of hot water (35 parts). The substance is free from chlorine and melts at 448° C. with decomposition. The analytical values (calculated: C 58.4%, H 2.8%, S 12.9%—found: C 58.8%, H 3.0%, S 12.5%) correspond to the empirical formula $C_{24}H_{14}O_8S_2$, i. e. a compound of the following structural formula

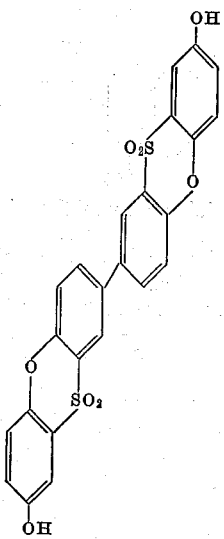

This application is in part a continuation of our application S. N. 394,498, filed November 25, 1953, and now Patent No. 2,734,052. This application is also in part a continuation of application Serial No. 366,616, filed July 7, 1953, now abandoned.

We claim:

1. Process of making cyclic-ether sulfones which comprises reacting quinones selected from the group consisting of 1,4-benzoquinone, 1,4-naphthoquinone and their inert substitution products having at least one free o-position with respect to the >C=O groups, in aqueous acid medium with organic sulfinic acids of the formula $$X\text{---}R\text{---}SO_2H$$

wherein X is a radical capable of reacting as an anion and R is a member of the group consisting of lower alkylene, o-phenylene, o-naphthylene and their inert substitution products to form an aryl-substituted sulfone, adjusting the reaction mixture to a weakly acid to alkaline pH then maintaining the reaction mixture at approximately the adjusted pH until ring formation is effected.

2. Process of making cyclic-ether sulfones which comprises reacting quinones selected from the group consisting of 1,4-benzoquinone, 1,4-naphthoquinone and their inert substitution products having at least one free o-position with respect to the >C=O groups, in aqueous acid medium with organic sulfinic acids of the formula X—R—SO₂H wherein X is a radical capable of reacting as an anion and R is a member of the group consisting of lower alkylene, o-phenylene, o-naphthylene and their inert substitution products at temperatures between about 0° C. and about 70° C. to form an aryl-substituted sulfone, adjusting the reaction mixture to a weakly acid to alkaline pH then maintaining the reaction mixture at approximately the adjusted pH until ring formation is effected.

3. The process of claim 1 wherein X is halogen.

4. The process of claim 1 wherein X is chlorine.

5. Process of making the compound corresponding to the formula

which comprises adding 1,4-benzoquinone to an aqueous acid solution of chloromethane sulfinic acid, and rendering and keeping the solution containing the formed addition product alkaline.

6. Process of making the compound corresponding to the formula

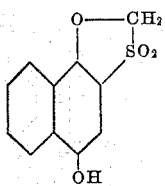

which comprises adding 1,4-naphthoquinone to an aqueous acid solution of chloromethane sulfinic acid, and rendering and keeping the solution containing the formed addition product alkaline.

7. Cyclic ether-sulfones of the general formula

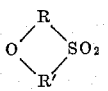

wherein R is a member of the group consisting of lower alkylene, o-phenylene, o-naphthylene and their inert substitution products and R' for an o-arylene radical selected from the group consisting of phenylene and naphthylene radicals and their inert substitution products bearing a OH-group in p-position to the ring oxygen atom.

8. Cyclic ether-sulfones of the general formula

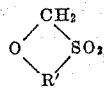

wherein R' stands for an o-phenylene radical and their inert substitution products bearing an OH-group in p-position to the ring oxygen atom.

9. The compound of the formula

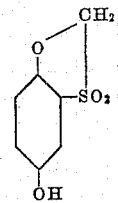

10. The compound of the formula

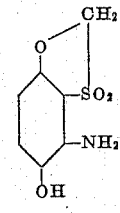

11. The compound of the formula

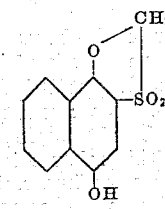

12. Cyclic ether-sulfones of the general formula

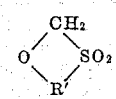

wherein R' stands for an o-naphthylene radical bearing an OH group in p-position to the ring oxygen atom, said o-naphthylene radical being devoid of active substituents.

13. Cyclic ether-sulfones of the general formula

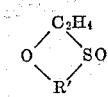

wherein R' stands for an o-phenylene radical bearing an OH group in p-position to the ring oxygen atom, said o-phenylene radical being devoid of active substituents.

14. Cyclic ether-sulfones of the general formula

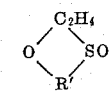

wherein R' stands for an o-naphthylene radical bearing an OH group in p-position to the ring oxygen atom, said o-naphthylene radical being devoid of active substituents.

No references cited.